United States Patent
Fritz

(10) Patent No.: US 11,572,661 B2
(45) Date of Patent: Feb. 7, 2023

(54) SELF-PROPELLED CONSTRUCTION MACHINE AND METHOD FOR CONTROLLING A SELF-PROPELLED CONSTRUCTION MACHINE

(71) Applicant: Wirtgen GmbH, Windhagen (DE)

(72) Inventor: Matthias Fritz, Hennef (DE)

(73) Assignee: Wirtgen GmbH

( * ) Notice: Subject to any disclaimer, the term of this patent is extended or adjusted under 35 U.S.C. 154(b) by 158 days.

(21) Appl. No.: 16/908,950

(22) Filed: Jun. 23, 2020

(65) Prior Publication Data
US 2021/0002833 A1 Jan. 7, 2021

(30) Foreign Application Priority Data
Jul. 4, 2019 (DE) .......................... 102019118059.7

(51) Int. Cl.
*E01C 19/00* (2006.01)
*B62D 6/02* (2006.01)
(Continued)

(52) U.S. Cl.
CPC .............. *E01C 19/004* (2013.01); *B62D 6/02* (2013.01); *B62D 11/06* (2013.01);
(Continued)

(58) Field of Classification Search
CPC ..... E01C 19/004; E01C 19/4893; B62D 6/02; B62D 11/06; G05D 1/0278; G05D 2201/0202
See application file for complete search history.

(56) References Cited

U.S. PATENT DOCUMENTS

| 3,602,115 A | 8/1971 | Hanson |
| 4,041,623 A | 8/1977 | Miller et al. |

(Continued)

FOREIGN PATENT DOCUMENTS

| DE | 19750315 A1 | 5/1998 |
| DE | 69131837 | 1/2000 |

(Continued)

OTHER PUBLICATIONS

European Search Report for corresponding patent application No. 20181844.0, dated Nov. 9, 2020, 8 pages (not prior art).

*Primary Examiner* — Jeff A Burke
*Assistant Examiner* — Mohamad O El Sayah
(74) *Attorney, Agent, or Firm* — Gary L. Montle; Lucian Wayne Beavers; Patterson Intellectual Property Law, PC

(57) ABSTRACT

A self-propelled construction machine comprises a machine frame having a working means arranged thereon, and a drive means for driving left and right crawler tracks at respective predetermined chain speeds. A control unit is configured such that, based on a distance between a front reference point with respect to the machine frame in the working direction and a predetermined path, the chain speed(s) of the left and/or right crawler track is predetermined such that the front reference point moves on the predetermined path. The control unit is further configured such that, during cornering, the control is corrected based on a distance between a rear reference point with respect to the machine frame in the working direction and the predetermined path such that the distance between the rear reference point with respect to the machine frame in the working direction and the predetermined path is reduced.

20 Claims, 7 Drawing Sheets

(51) Int. Cl.
  *B62D 11/06* (2006.01)
  *E01C 19/48* (2006.01)
  *G05D 1/02* (2020.01)
(52) U.S. Cl.
  CPC ....... *E01C 19/4893* (2013.01); *G05D 1/0278* (2013.01); *G05D 2201/0202* (2013.01)

(56) References Cited

U.S. PATENT DOCUMENTS

| | | | |
|---|---|---|---|
| 5,288,167 A | | 2/1994 | Gaffard et al. |
| 5,327,345 A | | 7/1994 | Nielsen et al. |
| 5,390,751 A | * | 2/1995 | Puetz .................... B62D 11/18 475/24 |
| 5,519,620 A | | 5/1996 | Talbot et al. |
| 5,549,412 A | | 8/1996 | Malone |
| 5,612,864 A | | 3/1997 | Henderson |
| 5,631,658 A | | 5/1997 | Gudat et al. |
| 5,838,277 A | | 11/1998 | Loomis et al. |
| 5,929,807 A | | 7/1999 | Viney et al. |
| 5,988,936 A | * | 11/1999 | Smith ................ E01C 19/4893 404/84.2 |
| 6,027,282 A | | 2/2000 | Horn |
| 6,047,227 A | | 4/2000 | Henderson et al. |
| 6,074,693 A | | 6/2000 | Manning |
| 6,088,644 A | | 7/2000 | Brandt et al. |
| 6,109,825 A | | 8/2000 | Yon |
| 6,113,309 A | | 9/2000 | Hollon et al. |
| 6,140,957 A | | 10/2000 | Wilson et al. |
| 6,144,318 A | | 11/2000 | Hayashi et al. |
| 6,191,732 B1 | | 2/2001 | Carlson et al. |
| 6,287,048 B1 | | 9/2001 | Hollon et al. |
| 6,371,566 B1 | | 4/2002 | Haehn |
| 6,425,186 B1 | | 7/2002 | Oliver |
| 6,481,924 B1 | | 11/2002 | Smolders et al. |
| 6,655,465 B2 | | 12/2003 | Carlson et al. |
| 6,736,216 B2 | | 5/2004 | Savard et al. |
| 6,769,836 B2 | | 8/2004 | Lloyd |
| 6,950,059 B2 | | 9/2005 | Rapoport et al. |
| 7,002,513 B2 | | 2/2006 | Brabec et al. |
| 7,363,154 B2 | | 4/2008 | Lindores |
| 7,399,139 B2 | | 7/2008 | Kieranen et al. |
| 7,491,014 B2 | | 2/2009 | Sick |
| 7,617,061 B2 | | 11/2009 | Brabec |
| 7,643,923 B2 | | 1/2010 | Buehlmann et al. |
| 7,946,787 B2 | | 5/2011 | Glee et al. |
| 8,018,376 B2 | | 9/2011 | McClure et al. |
| 8,174,437 B2 | | 5/2012 | Whitehead |
| 8,271,194 B2 | | 9/2012 | Whitehead et al. |
| 8,388,263 B2 | | 3/2013 | Fritz et al. |
| 8,888,402 B2 | | 11/2014 | Fritz et al. |
| 9,598,080 B2 | | 3/2017 | Fritz et al. |
| 2004/0057795 A1 | | 3/2004 | Mayfield et al. |
| 2004/0193348 A1 | | 9/2004 | Gray et al. |
| 2007/0290182 A1 | | 12/2007 | Noeske et al. |
| 2008/0208417 A1 | | 8/2008 | Buehlmann et al. |
| 2008/0253834 A1 | | 10/2008 | Colvard |
| 2010/0023229 A1 | | 1/2010 | Chiocco |
| 2010/0201994 A1 | | 8/2010 | Buehlmann |
| 2011/0150572 A1 | | 6/2011 | Fritz et al. |
| 2011/0229264 A1 | | 9/2011 | Weiser |
| 2012/0090909 A1 | | 4/2012 | Menzenbach et al. |
| 2012/0101725 A1 | | 4/2012 | Kondekar |
| 2013/0189031 A1 | * | 7/2013 | Fritz ...................... E01C 19/00 404/72 |
| 2014/0165693 A1 | | 6/2014 | Buschmann et al. |
| 2014/0348584 A1 | | 11/2014 | Fritz et al. |
| 2018/0327023 A1 | * | 11/2018 | Buschmann ............ E01C 19/22 |
| 2019/0276992 A1 | * | 9/2019 | Dahm .................. E01C 19/004 |

FOREIGN PATENT DOCUMENTS

| | | |
|---|---|---|
| DE | 29918747 U1 | 3/2000 |
| DE | 102008023743 A1 | 11/2009 |
| DE | 102009059106 A1 | 6/2011 |
| EP | 1103659 A2 | 5/2001 |
| EP | 1118713 A1 | 7/2001 |
| EP | 2119832 A1 | 11/2009 |
| EP | 2336424 A2 | 6/2011 |
| EP | 2620547 A1 | 7/2013 |
| EP | 2719829 A1 | 4/2014 |
| WO | 9203701 A1 | 3/1992 |
| WO | 9516228 A1 | 6/1995 |

* cited by examiner

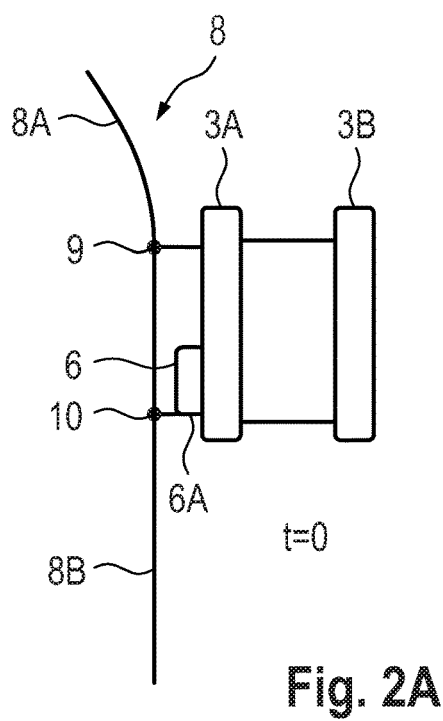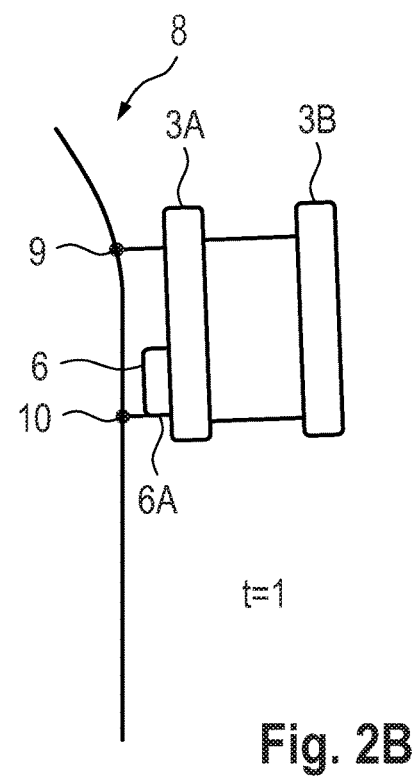
Fig. 2A  Fig. 2B
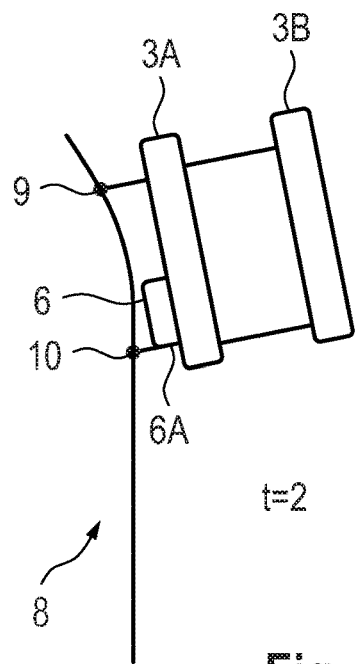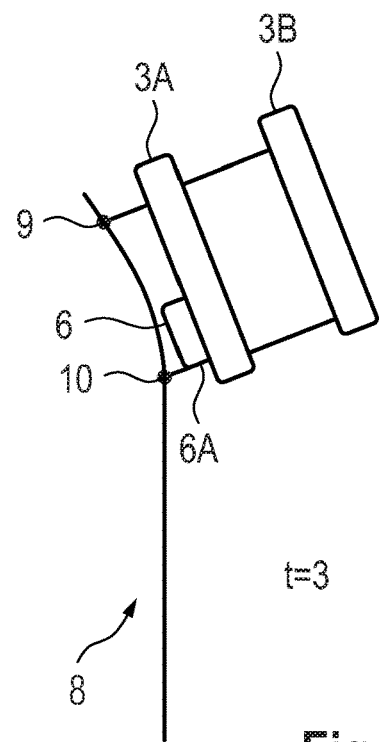
Fig. 2C  Fig. 2D

SELF-PROPELLED CONSTRUCTION MACHINE AND METHOD FOR CONTROLLING A SELF-PROPELLED CONSTRUCTION MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. 102019118059, filed Jul. 4, 2019, and which is hereby incorporated by reference.

BACKGROUND

The invention relates to a self-propelled construction machine which has a drive means having a left and a right crawler track, in particular a slipform paver, and to a method for controlling a self-propelled construction machine, in particular a slipform paver.

Known self-propelled construction machines are characterised in that they have a working means arranged on a machine frame for building structures on a terrain or for altering the terrain. In known slipform pavers, the working means comprises a device for moulding flowable material, in particular concrete, which is referred to in the following as a concrete trough. The concrete trough allows structures of various designs to be produced, for example guiding walls or traffic islands. A slipform paver is described in EP 1 103 659 B1, for example.

Self-propelled construction machines have running gears, in particular crawler tracks, which are arranged on the left- and right-hand side of the machine frame in the working direction, and a drive means for driving the running gears such that the construction machine can carry out translational and/or rotary movements on the terrain.

In the case of self-propelled construction machines, the aim is largely automatic control without significant intervention by the driver. The automatic control of the construction machine involves the drive means being controlled in such a way that an arbitrary reference point with respect to the construction machine moves on a predetermined path. The predetermined path can include straight and/or curved sections.

A known method for controlling self-propelled construction machines requires the use of a guide wire by means of which the path or an equidistant to the path is established. Controlling self-propelled construction machines using a global navigation satellite system (GNSS) is also known. EP 2 620 547 A1 describes a construction machine with control of the drive means using a guide wire and EP 2 336 424 A1 describes a construction machine with control of the drive means using a global navigation satellite system (GNSS).

The problem with automatic control of construction machines is that the construction machine has to move when cornering such that the working means is always in the correct position and in the correct orientation, so that a slipform paver, for example, can be used to build a structure in the correct position in the correct orientation.

Self-propelled construction machines which have a front left and right running gear in the working direction and a rear left and right running gear can be steered such that they can follow the predetermined path in the desired orientation with sufficient accuracy. A front reference point can be established for the control of the front running gears and a rear reference point can be established for the control of the rear running gears, it being possible to actuate the front and rear running gears in such a way that both the front and the rear reference point move on the predetermined path. The separate actuation of the front and rear running gears allows the desired orientation of the construction machine to be maintained when cornering.

In the case of construction machines that have only a left and right crawler track, the steerability is limited, however. Therefore, when controlling the drive means of construction machines with only a left and right crawler track, the problem arises in practice that a reference point with respect to the construction machine on which the control is based and which is preferably a front reference point in the working direction moves on the predetermined path, but a rear reference point does not follow the predetermined path. If the construction machine is a slipform paver, the rear end of the slipform thus cannot follow the predetermined path, meaning the structure to be built or parts thereof are not in the right place later.

BRIEF SUMMARY

The problem addressed by the invention is that of providing a self-propelled construction machine having a left and right crawler track, in particular a slipform paver, which follows a predetermined path in the terrain in the desired orientation. A further problem addressed by the invention is that of providing a method for controlling a self-propelled construction machine having a left and right crawler track, in particular a slipform paver, by means of which the self-propelled construction machine follows the predetermined path in the correct orientation.

The self-propelled construction machine according to the invention, in particular a slipform paver, comprises a machine frame, a working means arranged on the machine frame, a crawler track on the left in the working direction and a crawler track on the right in the working direction, and a drive means for driving the left crawler track at a predetermined chain speed and the right crawler track at a predetermined chain speed. In addition, the construction machine has a control unit which is configured such that, on the basis of the distance between a front reference point with respect to the machine frame in the working direction and a predetermined path, the chain speed of the left crawler track and/or the chain speed of the right crawler track is predetermined such that the front reference point moves on the predetermined path.

In this context, a predetermined path is understood to mean any line which can have straight and/or curved sections. The reference point can be any point on the construction machine, for example on the machine frame, or next to the construction machine. Control in such a way that the reference point moves on or along a predetermined path is understood to mean control which aims to ensure that the deviation between the current position of the reference point and the desired position is minimal, i.e. the reference point does not have to lie precisely on the predetermined path, which will not even be the case in practice.

A front reference point is understood to be a reference point that lies in front of a rear reference point in the working direction. The front reference point preferably lies in a front region of the construction machine, in particular in the region of the front rollers or roller of the front crawler track, while the rear reference point preferably lies in a rear region of the construction machine.

Control based only on the front reference point means that the rear reference point does not follow the predetermined path when the construction machine is cornering. The control unit of the construction machine according to the invention is therefore configured such that, during cornering, the control is corrected on the basis of the distance between a rear reference point with respect to the machine frame in the working direction and the predetermined path such that the distance between the rear reference point with respect to the machine frame in the working direction and the predetermined path reduces. As a result, the deviation of the rear reference point from the predetermined path is detected. The control can be corrected with a targeted steering movement which, despite allowing the front reference point to deviate from the predetermined path, allows the rear reference point to move in the direction of the predetermined path, such that, with respect to the rear reference point, the distance from the predetermined path is reduced. It is assumed that the smallest possible deviation of the rear reference point from the predetermined path is decisive for an optimal work result.

According to a preferred embodiment of the construction machine according to the invention, the control unit is configured such that, during cornering of the construction machine, a corrected path is assumed for the control of the construction machine on the basis of the distance between a front reference point with respect to the machine frame in the working direction and a predetermined path. As a result, the control is based on a corrected path as the predetermined path. The corrected path extends at a predetermined distance from the originally predetermined path, which predetermined distance is dependent on the distance between the rear reference point with respect to the machine frame in the working direction and the originally predetermined path. A greater distance between the rear reference point and the originally predetermined path leads to a greater correction than a smaller distance, in order to move the rear reference point in the direction of the originally predetermined path.

The correction can be made for the provided control by specifying a corrected target value, i.e. a point lying on the corrected path, which is compared with an actual value, i.e. the current position of the front reference point, in order to determine the control deviation, i.e. the distance between the front reference point and the corrected path.

A suitable correction function can be determined for the control. The distance between the corrected path and the predetermined path can be the distance, calculated with a correction factor, between the rear reference point with respect to the machine frame in the working direction and the predetermined path. For example, a suitable offset can be specified for the correction.

The steering correction depends on whether the construction machine navigates a left- or right-hand curve. During cornering, a corrected path which extends at a distance from the predetermined path on the inside of the curve of the predetermined path is assumed for the control of the construction machine on the basis of the distance between a front reference point with respect to the machine frame in the working direction and a predetermined path. However, this presupposes that the rear reference point in the working direction of the construction machine lies behind the pivot point of the construction machine. If the pivot point is ideally in the centre of the construction machine, the rear reference point thus has to be in the rear half of the machine. Consequently, under this condition, a steering correction to the left is first carried out for a left-hand curve and a steering correction to the right is first carried out for a right-hand curve. If, however, the rear reference point lies in front of the pivot point of the construction machine in the working direction of the construction machine, a steering correction to the right is carried out for a left-hand curve and a steering correction to the left is carried out for a right-hand curve.

The drive means of the construction machine can include, for example, a central manual gearbox and a differential drive. Alternatively, driving using two drive trains each having a gearbox can also be provided. The control unit is configured such that, for a steering correction while driving into a left-hand curve, the chain speed of the right crawler track on the outside of the curve is increased and/or the chain speed of the left crawler track on the inside of the curve is reduced. The control unit is further configured such that, for a steering correction while driving into a right-hand curve, the chain speed of the left crawler track on the inside of the curve is increased and/or the chain speed of the right crawler track on the outside of the curve is reduced.

The establishment of the predetermined path and the detection of the distance between the front and rear reference point and the predetermined path can take place in different ways.

A preferred embodiment involves the use of a guide wire which is laid at a defined distance (equidistant) from the predetermined path. When a guide wire is used, the control unit comprises a first distance measuring means which has a first distance sensor which is arranged at the front reference point, the first distance measuring means being designed such that the distance between the front reference point and the guide wire describing the predetermined path can be measured. In addition, the control unit comprises a second distance measuring means which has a second distance sensor which is arranged at the rear reference point, the second distance measuring means being designed such that the distance between the rear reference point and the guide wire can be measured. The distance sensors can be tactile sensors or contactless sensors by means of which the guide wire is scanned as the construction machine advances. Such scanning systems are part of the prior art.

An alternative embodiment involves the use of a global navigation satellite system (GPS). When using a global navigation satellite system (GPS), the control unit has a first GPS receiver and a second GPS receiver for receiving GPS satellite signals.

The control unit can be configured such that the position and orientation of the construction machine are determined using the first GPS receiver and the second GPS receiver. The positions of the front and rear reference points can thus be determined based on the known geometry of the machine. The control unit can further be configured such that the distance between the front reference point and the predetermined path is determined from data describing the predetermined path and the signals from the first GPS receiver and the second GPS receiver and the position of the front reference point determined therefrom, and the distance between the rear reference point and the predetermined path is determined from data describing the predetermined path and the signals from the first GPS receiver and the second GPS receiver and the position of the rear reference point determined therefrom. The GPS receivers are preferably DGPS receivers which decode correction signals from a reference station in order to increase the accuracy of the position determination.

Alternatively, it is possible to position the first GPS receiver on the front reference point and/or to position the second GPS receiver on the rear reference point. In this way, the positions of the front and/or rear reference point and the distance between the front and/or rear reference point and the predetermined path can be determined directly.

The advantages of the invention are particularly evident in the case of a slipform paver of which the working means is a slipform. In the case of a slipform paver, it is crucial for an optimal work result that the rear end of the slipform, at which the concrete exits, moves along a predetermined path that corresponds to the shape of the structure to be built, for example a guiding wall. The rear reference point for a slipform paver is therefore at the level of the rear end of the slipform in the working direction. The rear reference point can be at the rear end of the slipform on the longitudinal axis or on the left- or right-hand side of the longitudinal axis.

Numerous objects, features and advantages of the embodiments set forth herein will be readily apparent to those skilled in the art upon reading of the following disclosure when taken in conjunction with the accompanying drawings.

BRIEF DESCRIPTION OF THE SEVERAL VIEWS OF THE DRAWINGS

An embodiment of the invention is explained in detail below with reference to the figures.

In the drawings:

FIG. 2A to 2D show the positions of the slipform paver during the movement on a predetermined path at times $t_0$ to $t_3$, in which a front and rear reference point move precisely on the predetermined path.

DETAILED DESCRIPTION

Figure 1:
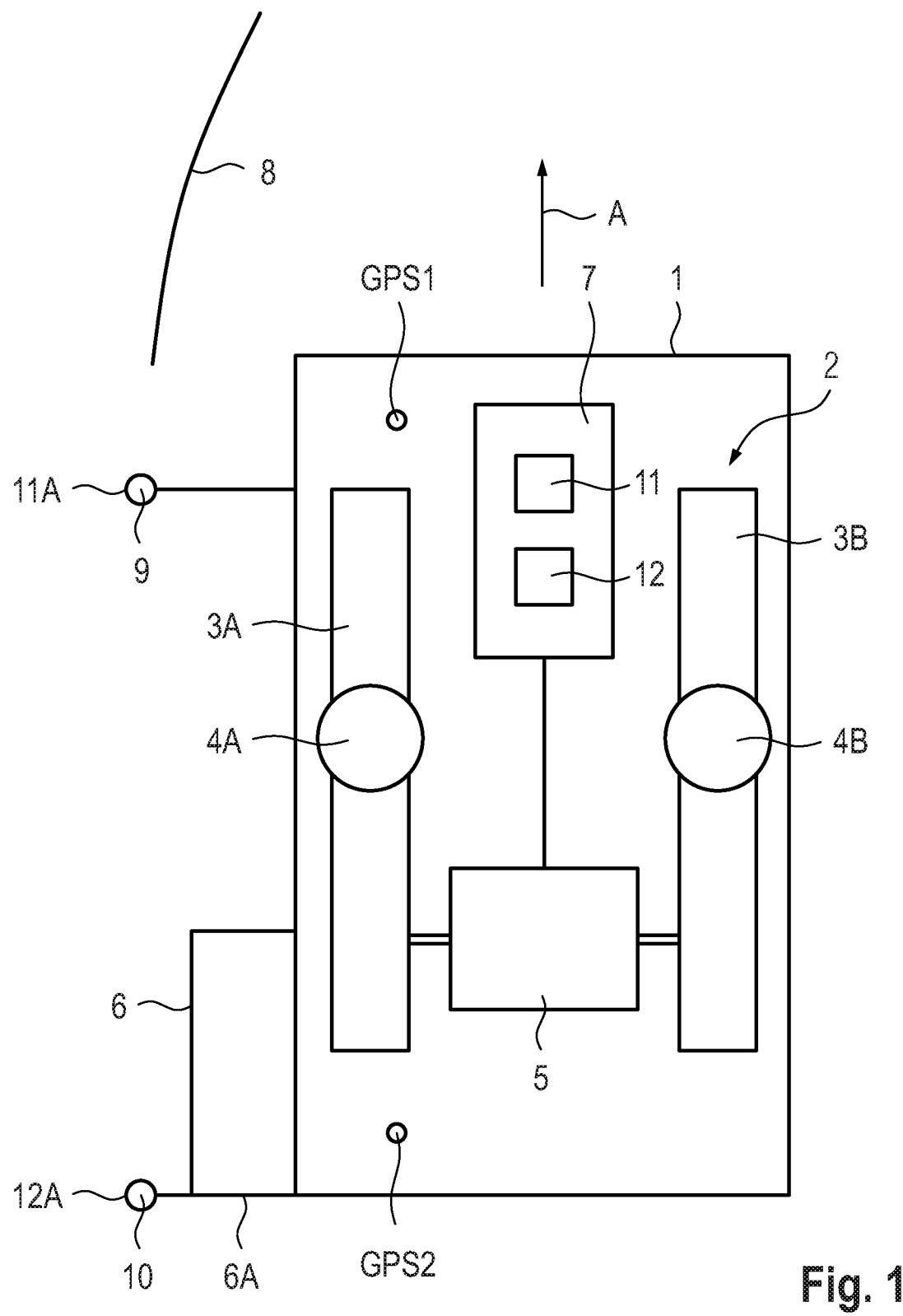
FIG. 1 shows an embodiment of a slipform paver in a highly schematic representation.

FIG. 1 shows, as an example of a self-propelled construction machine, the essential components of a slipform paver in a highly simplified schematic representation. Since slipform pavers as such belong to the prior art, only the components of the construction machine that are essential to the invention will be described here.

The slipform paver has a machine frame 1 which is supported by a chassis 2. The chassis 2 has a crawler track 3A on the left in the working direction and a crawler track 3B on the right in the working direction, which are fastened to the machine frame by means of left and right lifting means 4A, 4B. The left and/or right lifting means 4A, 4B can each comprise a plurality of lifting columns. By lifting and lowering the lifting means 4A, 4B, the machine frame 1 can be moved in terms of height and inclination relative to the ground. The working direction (travel direction) of the slipform paver is marked with an arrow A.

To drive the left and the right crawler track 3A, 3B, the slipform paver has a drive means 5 which can comprise, for example, a central manual gearbox and a differential drive or two separate drive trains each having a gearbox such that the left and right crawler tracks can each be driven at a predetermined chain speed (rotational speed).

The slipform paver has a device 6, shown only in outline, for moulding flowable material, in particular concrete, which is referred to in the following as a concrete trough 6. The concrete exits from the rear end 6A of the concrete trough 6.

In addition, the slipform paver has a control unit 7 which can form a separate assembly or can be integrated in the machine controller. The control unit 7 can consist of a plurality of assemblies which can be located not only on but also next to the construction machine.

The control unit 7 is configured such that the chain speeds of the left and right crawler track 3A, 3B can be predetermined. If the chain speeds of the right and left crawler track are the same, the slipform paver travels straight ahead. Cornering takes place as a result of different chain speeds, with the curve radius being determined by the difference in the chain speeds. Consequently, the slipform paver can be controlled by means of the control unit 7 in such a way that the slipform paver moves on a predetermined path 8. This path 8 corresponds to the shape of the structure to be built and can have straight and/or curved sections.

FIG. 2A to 2D show the movement of the slipform paver in the terrain on a predetermined path 8 which comprises a straight section 8A (curve) and a curved section 8B (straight line). FIG. 2A to 2D schematically show only the left and right crawler track 3A, 3B and the slipform 6. The drive means 5 of the slipform paver is actuated in such a way that the slipform paver moves as precisely as possible on or along the predetermined path 8 while advancing. For stable control, a reference point 9 is specified which lies in the front region of the slipform paver. The distance between the front reference point 9 and the predetermined path 8 ought to be as small as possible, i.e. the front reference point ought to move precisely on the predetermined path. For an optimal work result, however, it is crucial that a rear reference point 10, which is located at the level of the rear end 6A of the slipform 6 at which the concrete exits, moves precisely on the predetermined path 8. FIG. 2A to 2D show this ideal case, which, however, cannot be achieved with the slipform paver according to the invention, which has only a left and right crawler track 3A, 3B, because of the limited steerability.

Figure 3A:
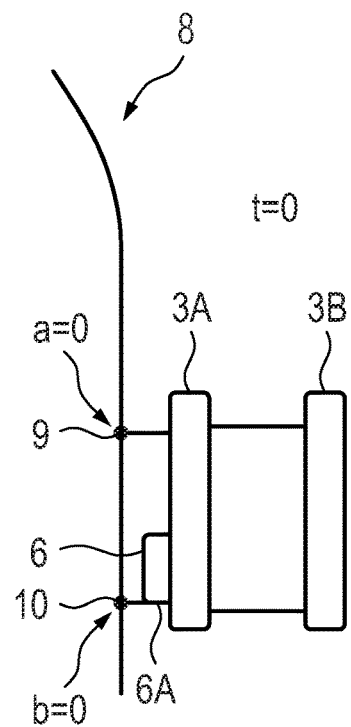
FIG. 3A to 3G show the positions of the slipform paver at times $t_0$ to $t_6$, in which a steering correction is not made.
Figure 3B:
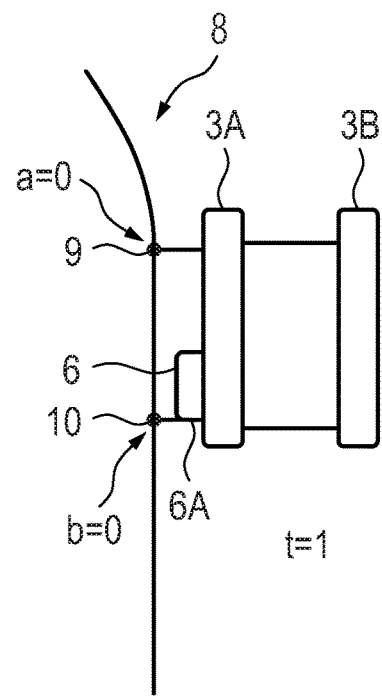
Figure 3C:
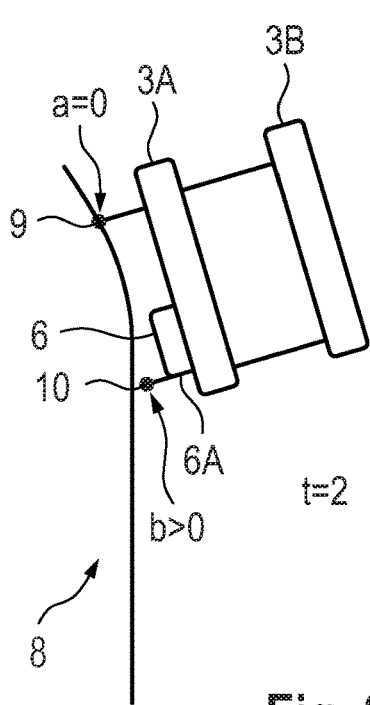
Figure 3D:
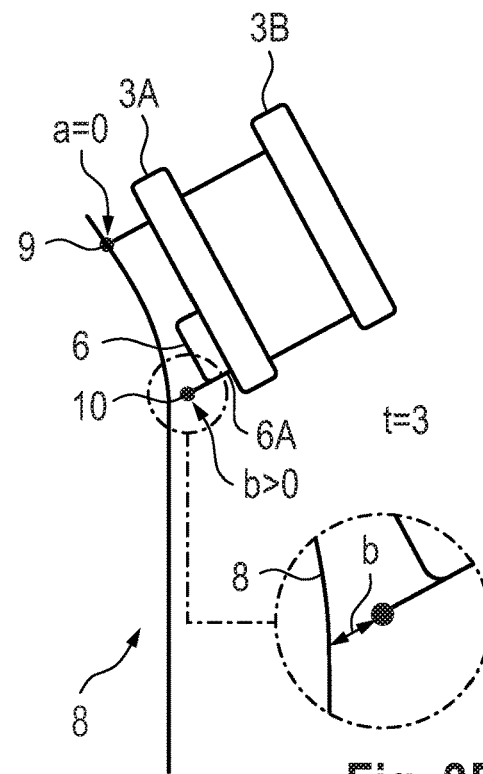
Figure 3E:
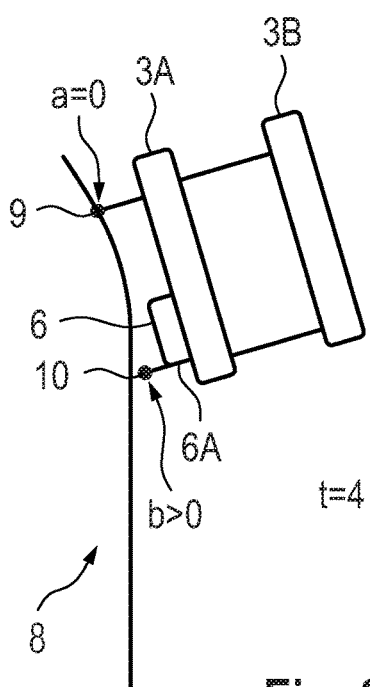
Figure 3F:
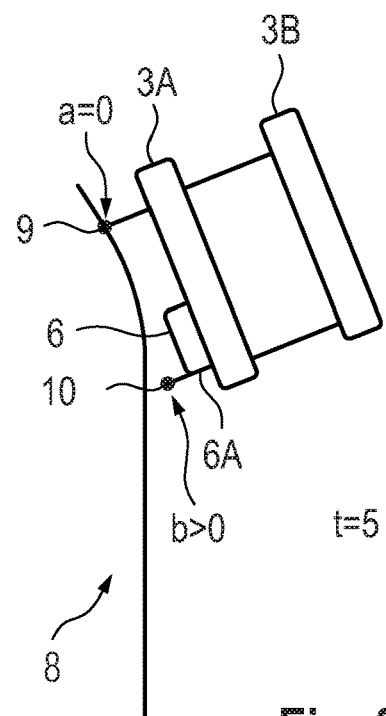
Figure 3G:
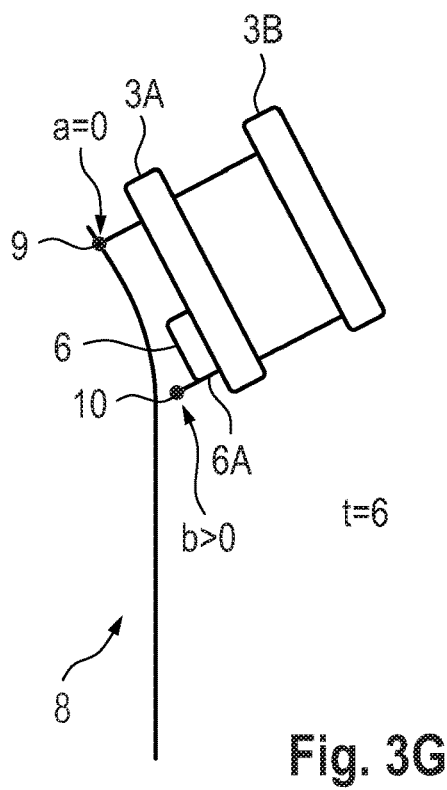

FIG. 3A to 3F show control based on the distance a between the front reference point 9 and the predetermined path 8. FIG. 3A to 3F show the position of the construction machine at the successive times t=0 to t=6. It can be seen that the front reference point 9 moves on the predetermined path 8. Therefore the distance a=0. However, the rear reference point 10 cannot follow the predetermined path 8. It can be seen that in the case of a left-hand curve the rear reference point 10 drifts to the outside of the curve, i.e. to the right, such that the distance b is greater than zero and the rear end 6A of the slipform 6 is not in the correct position (FIG. 3C and FIG. 3D).

The control according to the invention is described in the following with reference to FIG. 4A to 4J. FIG. 4A to 4J show the position of the construction machine at the successive times t=0 to t=9.

The control unit 7 has a first and a second distance measuring means 11 and 12 in order to be able to determine the distance between the front and rear reference point 9, 10 and the predetermined path 8 (FIG. 1). In the present embodiment, the path 8 is predetermined by a guide wire which is tensioned in the terrain.

The first distance measuring means 11 has a tactile or contactless first distance sensor 11A which is arranged at the front reference point 9 in order to measure the distance between the front reference point 9 and the guide wire 8. The second distance measuring means 12 has a tactile or contactless second distance sensor 12A which is arranged at the rear reference point 10 in order to measure the distance between the rear reference point and the guide wire (FIG. 1). It should be noted that, for the control of the drive means 5, the arrangement of the front and rear distance sensors 11A, 12A is essentially arbitrary as long as the distance sensors 11A, 12A are at the level of the front and rear reference points 9, 10 in the working direction of the construction machine, since the geometric dimensions of the slipform paver are known. The distance sensors can therefore lie on an axis which extends transversely to the working direction and which extends through the front or rear reference point.

The control unit 7 generates control signals for the components of the drive means 5 (not shown) such that different chain speeds can be predetermined for the left and right crawler track 3A, 3B. These components can include hydraulic, pneumatic or electrical components. The control unit 7 can comprise analog or digital circuits. For example, it can have a general processor, a digital signal processor (DSP) for continuous processing of digital signals, a microprocessor, an application-specific integrated circuit (ASIC), an integrated circuit consisting of logic elements (FPGA), or other integrated circuits (IC) or hardware components. A data processing program (software) can run on the hardware components in order to be able to actuate the individual components of the slipform paver.

The control unit 7 is configured such that, on the basis of the distance a between the front reference point 9 with respect to the machine frame 1 in the working direction and the predetermined path 8, the chain speed of the left crawler track 3A and/or the chain speed of the right crawler track 3B is predetermined such that the front reference point 9 moves on the predetermined path 8.

If, in the case of a left-hand curve, the front reference point 9 is at a distance from the predetermined path 8 on the inside of the curve, the control unit 7 adjusts the chain speeds of the left and right crawler track 3A, 3B in such a way that the left running gear 3A rotates faster than the right running gear 3B and the slipform paver swivels to the right. If, in the case of a left-hand curve, the front reference point 9 is at a distance from the predetermined path 8 on the outside of the curve, the control unit 7 adjusts the chain speeds of the left and right crawler track 3A, 3B in such a way that the right running gear 3B rotates faster than the left running gear 3A and the slipform paver swivels to the left. Consequently, there is a continuous comparison between a target value for the distance (0) and an actual value (a).

As shown in FIG. 3A to 3D, the control described above means that the rear reference point 10 does not follow the path 8 and the distance between the rear reference point and the path increases. In the case of a left-hand curve, the rear reference point moves to the outside of the curve on the right.

As the slipform paver advances, the second distance measuring means 12 monitors the distance b between the rear reference point 10 and the predetermined path 8. If the rear reference point 10 is at a distance b from the path 8, the control unit 7 carries out a steering correction in order to move the rear reference point back in the direction of the path. The steering correction can take place in that the control unit 7 calculates a corrected path 8', on the basis of the distance b, which is used instead of the predetermined path as the basis for the control based on the front reference point.

Figure 4A:
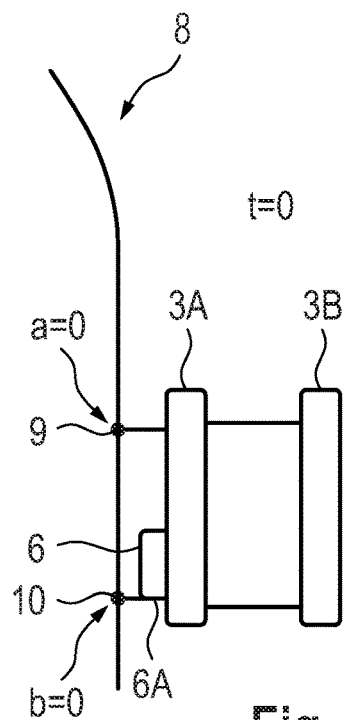
FIG. 4A to 4J show the positions of the slipform paver at times $t_0$ to $t_9$, in which a steering correction is made.
Figure 4B:
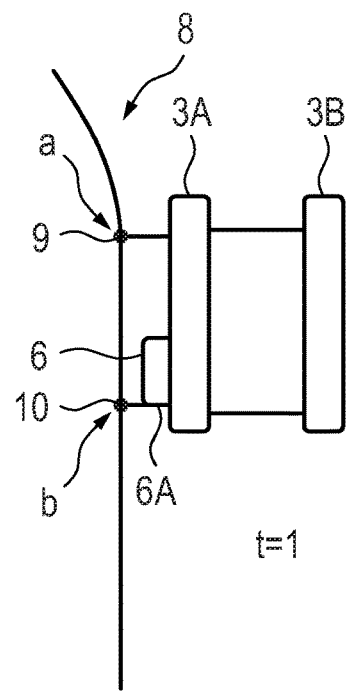
Figure 4C:
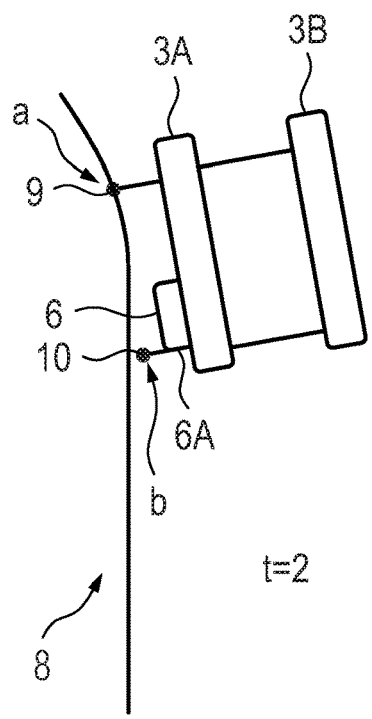
Figure 4D:
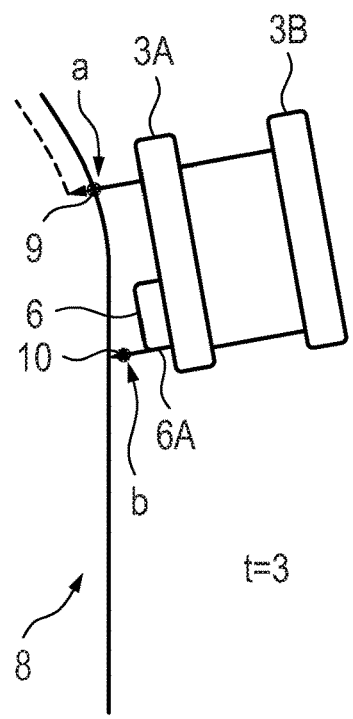
Figure 4E:
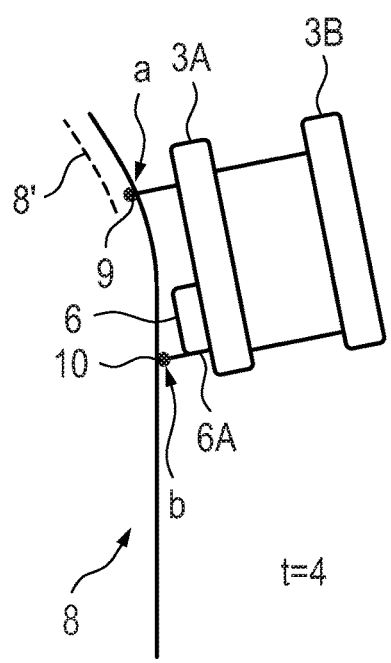
Figure 4F:
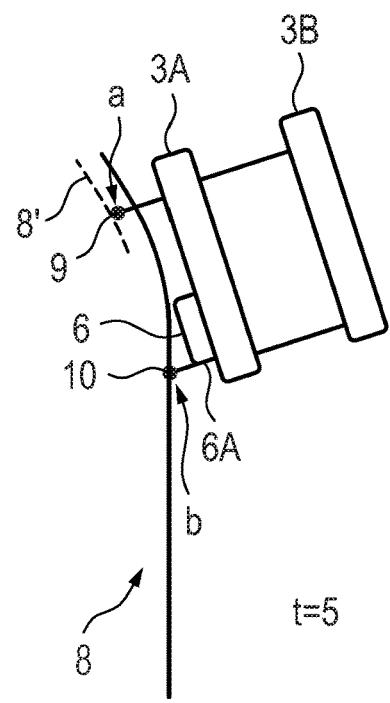
Figure 4G:
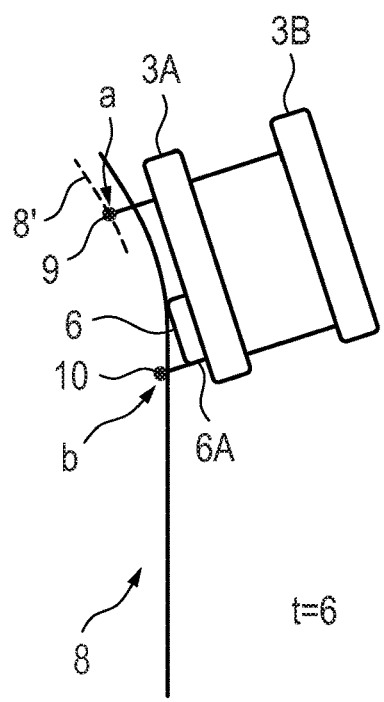
Figure 4H:
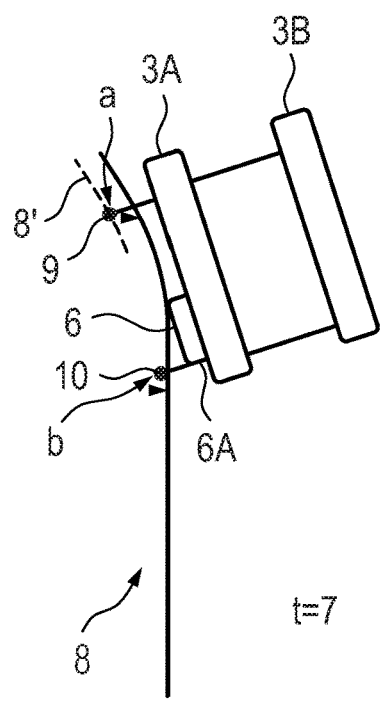
Figure 4I:
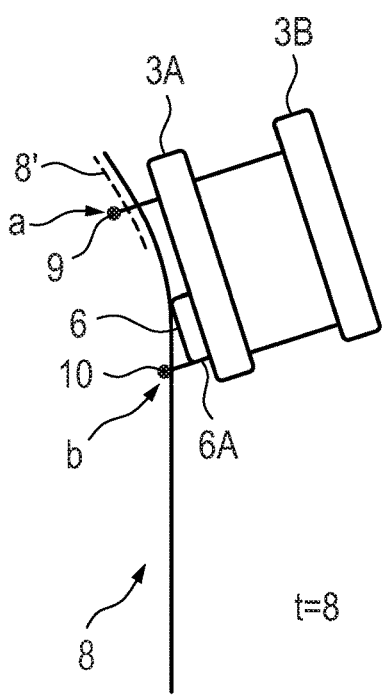
Figure 4J:
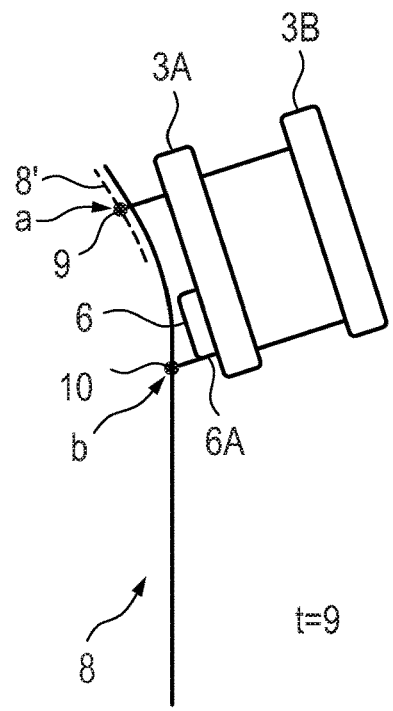

If in the case of a left-hand curve the rear reference point 10 is at a distance b from the predetermined path on the outside of the curve (FIG. 4C), i.e. the second distance measuring means measures a distance b, a value which the control unit 7 determines by calculating, for example multiplying, the distance b of the rear reference point 10 from the predetermined path 8 with a correction factor is set as the target value for the target-value actual-value comparison. In the present embodiment, 1 is assumed as the correction factor. This results in a new, corrected target value for the control based on the front reference point 9, which corresponds to the distance b between the rear reference point 10 and the predetermined path 8. Consequently, an offset which is dependent on the distance b is specified for the control. The greater the distance b, the greater the offset. The specification of the offset leads to the control unit 7 increasing the speed of the right crawler track 3B on the outside of the curve and/or reducing the speed of the left crawler track 3A on the inside of the curve, such that the front reference point 9 moves to the inside of the curve. As a result, the distance b between the rear reference point 10 and the predetermined path 8 is reduced. The figures show that the distance between the corrected path 8' and the predetermined path 8 decreases when the distance between the rear reference point 10 and the predetermined path 8 decreases. When the rear reference point 10 lies on the predetermined path 8 again, a steering correction no longer takes place. In FIGS. 4I and 4J, the rear reference point drifts, over its course, to the inside of the curve so that a correction to the right has to be made.

Figure 5:
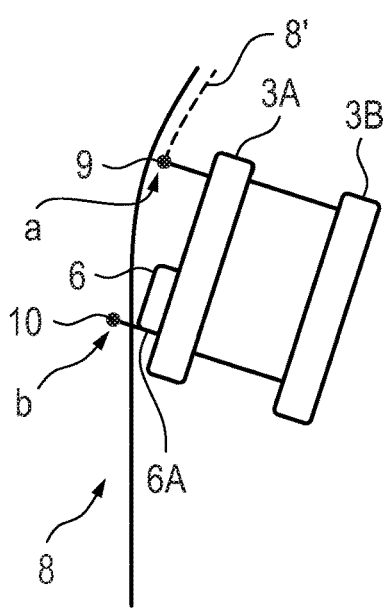
FIG. 5 shows a slipform paver navigating a right-hand curve.

The situation is similar when driving into a right-hand curve. FIG. 5 shows a right-hand curve, in which the rear reference point 10 drifts to the outside of the curve, i.e. to the left. As a result, the steering is corrected by the slipform paver swiveling to the right.

A wide range of controller types known from the prior art can be used for the control. The corresponding control algorithms are known to a person skilled in the art.

According to an alternative embodiment, the control unit 7 has a first, front and second, rear GPS receiver, preferably DGPS receiver, for receiving GPS satellite signals from a global navigation satellite system (GPS). A differential global positioning system (DGPS) allows the accuracy to be increased by transmitting correction data using a fixed reference station of which the exact position is known. The front GPS receiver GPS1 may be located at the front reference point and the rear GPS receiver GPS2 may be located at the rear reference point in place of the front and rear distance sensors 11A, 12A in order to determine the positions of the reference points (FIG. 1). In this embodiment, the guide wire is replaced by a predetermined path in a GPS coordinate system that is independent of the movement of the slipform paver, with the path in the GPS coordinate system being described using position and direction data. In this embodiment the control unit 7 is configured such that the distance a between the front reference point 9 and the predetermined path 8 is determined from data describing the predetermined path and the signals from the first GPS receiver, and the distance b between the rear reference point 10 and the predetermined path 8 is determined from data describing the predetermined path and the signals from the second GPS receiver. The chain speeds of the two crawler tracks 3A, 3B are controlled as in the first embodiment.

In the present embodiment, however, the front and rear GPS receivers GPS1 and GPS2 are not arranged at the front or rear reference point, but rather at an arbitrary location. FIG. 1 shows the front GPS receiver GPS1 in the front region of the machine frame 1 and the rear GPS receiver GPS2 in the rear region of the machine frame. The control unit 7 is configured such that the position of the front and rear GPS receiver in the GPS coordinate system is determined by means of the global positioning system (DGPS) and the position and orientation of the construction machine are determined from the positions of the front and rear GPS receiver. The positions of the front and rear reference point are then calculated using the known geometry of the construction machine.

What is claimed is:

1. A self-propelled construction machine comprising:
a machine frame;
a working means arranged on the machine frame;
only one crawler track on the left in the working direction and only one crawler track on the right in the working direction;
a drive means for separately driving the left crawler track and the right crawler track at respective chain speeds; and
a control unit configured wherein:
based on a distance between a front reference point with respect to the machine frame in the working direction and a predetermined path, the chain speed of the left crawler track and/or the chain speed of the right crawler track is predetermined such that the front reference point moves on the predetermined path, and
during cornering of the construction machine, a control of the respective chain speeds of the left crawler track and/or the right crawler track based on a position of the front reference point relative to the predetermined path is further corrected based on a distance between a rear reference point with respect to the machine frame in the working direction and the predetermined path such that the distance between the rear reference point with respect to the machine frame in the working direction and the predetermined path is reduced,
wherein a distance between the front reference point and the rear reference point is maintained throughout the control.

2. The self-propelled construction machine according to claim 1, wherein:
the control unit is configured such that, during cornering of the construction machine, a corrected path which extends at a distance from the predetermined path that depends on the distance between the rear reference point with respect to the machine frame in the working direction and the predetermined path is assumed for the control of the construction machine on the basis of the distance between the front reference point with respect to the machine frame in the working direction and the predetermined path.

3. The self-propelled construction machine according to claim 2, wherein:
the control unit is configured such that, during cornering of the construction machine, a corrected path which extends at a predetermined distance from the predetermined path on the inside of the curve of the predetermined path is assumed for the control of the construction machine on the basis of the distance between a front reference point with respect to the machine frame in the working direction and a predetermined path.

4. The self-propelled construction machine according to claim 1, wherein:
the distance between a corrected path and the predetermined path is the distance, calculated with a correction factor, between the rear reference point with respect to the machine frame in the working direction and the predetermined path.

5. The self-propelled construction machine according to claim 1, wherein:
the control unit is configured such that, during cornering of the construction machine, actuation of the drive means is corrected such that the difference in the chain speeds of the left crawler track and the right crawler track is altered based on the distance between the rear reference point with respect to the machine frame in the working direction and the predetermined path.

6. The self-propelled construction machine according to claim 1, wherein the control unit is configured such that when driving into a left-hand curve, the speed of the right crawler track is increased and/or the speed of the left crawler track is reduced.

7. The self-propelled construction machine according to claim 1, wherein the control unit is configured such that when driving into a right-hand curve, the speed of the left crawler track is increased and/or the speed of the right crawler track is reduced.

8. The self-propelled construction machine according to claim 1, further comprising:
a first distance sensor arranged at the front reference point and configured to measure a distance between the front reference point and a guide wire describing the predetermined path; and
a second distance sensor arranged at the rear reference point and configured to measure a distance between the rear reference point and the guide wire.

9. The self-propelled construction machine according to claim 1, further comprising:
a first GPS receiver and a second GPS receiver for receiving GPS satellite signals from a global navigation satellite system (GPS),
wherein the control unit is configured such that:
the positions of the front and rear reference point (9) are determined via the first and second GPS receiver, and
the distance between the front reference point and the predetermined path is determined from data describing the predetermined path and the determined position of the front reference point, and
the distance between the rear reference point and the predetermined path is determined from data describing the predetermined path and the position of the rear reference point.

10. The self-propelled construction machine according to claim 1, wherein:
the construction machine is a slipform paver and the working means is a slipform, the rear reference point lying at the level of the rear end of the slipform in the working direction.

11. A method for controlling a self-propelled construction machine which comprises a machine frame, a working means arranged on the machine frame, only one crawler track on the left in the working direction and only one crawler track on the right in the working direction, and a drive means for separately driving the left crawler track and the right crawler track at respective chain speeds, wherein based on a distance between a front reference point with respect to the machine frame in the working direction and a predetermined path, the chain speed of the left crawler track and/or the chain speed of the right crawler track are predetermined such that the front reference point moves on the predetermined path, the method comprising:

during cornering of the construction machine, correcting a control of the respective chain speeds of the left crawler track and/or the right crawler track based on a distance between a rear reference point with respect to the machine frame in the working direction and the predetermined path such that the distance between the rear reference point with respect to the machine frame in the working direction and the predetermined path is reduced.

12. The method according to claim 11, wherein, during cornering of the construction machine, a corrected path which extends at a distance from the predetermined path that depends on the distance between the rear reference point with respect to the machine frame in the working direction and the predetermined path is assumed for the control of the construction machine based on the distance between the front reference point with respect to the machine frame in the working direction and a predetermined path.

13. The method according to claim 12, wherein, during cornering of the construction machine, a corrected path which extends at a distance from the predetermined path on the inside of the curve of the predetermined path is assumed for the control of the construction machine based on the distance between a front reference point with respect to the machine frame in the working direction and a predetermined path.

14. The method according to claim 11, wherein the distance between a corrected path and the predetermined path is the distance, calculated with a correction factor, between the rear reference point with respect to the machine frame in the working direction and the predetermined path.

15. The method according to claim 11, wherein, during cornering of the construction machine, the difference in the speeds of the left crawler track and the right crawler track is altered based on the distance between the rear reference point with respect to the machine frame in the working direction and the predetermined path.

16. The method according to claim 11, wherein, when driving into a left-hand curve, the speed of the right crawler track is increased and/or the speed of the left crawler track is reduced.

17. The method according to claim 11, wherein, when driving into a right-hand curve, the speed of the left crawler track is increased and/or the speed of the right-hand crawler track is reduced.

18. The method according to claim 11, comprising:
measuring a distance between the front reference point and a guide wire describing the predetermined path, and
measuring a distance between the rear reference point and the guide wire.

19. The method according to claim 11, comprising:
determining the distance between the front reference point and the predetermined path from data describing the predetermined path and the signals from a first and a second GPS receiver for receiving signals from a global navigation satellite system (GPS), and
determining the distance between the rear reference point and the predetermined path from data describing the predetermined path and the signals from the first and second GPS receiver for receiving GPS signals from a global navigation satellite system (GPS).

20. The method according to claim 11, wherein:
the construction machine is a slipform paver and the working means is a slipform, the rear reference point lying at the level of the rear end of the slipform in the working direction.

* * * * *